United States Patent
Schmitz

(10) Patent No.: US 6,198,370 B1
(45) Date of Patent: Mar. 6, 2001

(54) METHOD AND APPARATUS FOR OPERATING A CYLINDER VALVE WITH AN ELECTROMAGNETIC ACTUATOR WITHOUT POLE FACE CONTACTING

(75) Inventor: Günter Schmitz, Aachen (DE)

(73) Assignee: FEV Motorentechnik GmbH & Co. KG, Aachen (DE)

(*) Notice: Subject to any disclaimer, the term of this patent is extended or adjusted under 35 U.S.C. 154(b) by 0 days.

(21) Appl. No.: 08/988,167

(22) Filed: Dec. 10, 1997

(30) Foreign Application Priority Data

Dec. 13, 1996 (DE) .............................. 196 51 846

(51) Int. Cl.$^7$ ...................................... H01F 3/00
(52) U.S. Cl. ........................ 335/256; 251/129.1
(58) Field of Search ............. 251/129.01, 129.1, 251/129.05; 335/256, 266, 268, 269, 177–179, 228, 229, 230

(56) References Cited

U.S. PATENT DOCUMENTS 4,455,543  6/1984  Pischinger et al. .
5,636,601 * 6/1997  Moriya et al. .................. 128/90.11
5,734,309 * 3/1998  Schmitz ............................. 335/177

\* cited by examiner

Primary Examiner—Lincoln Donovan
(74) Attorney, Agent, or Firm—Venable; Gabor J. Kelemen

(57) ABSTRACT

A method and an apparatus for operating a cylinder valve of an internal-combustion engine with an electromagnetic actuator for moving the cylinder valve into opposite open and closed valve end positions. The electromagnetic actuator has two spaced electromagnets provided with pole faces and being energizable with a controllable current flow, an armature operatively connected to the cylinder valve and arranged between the two electromagnets for a reciprocating motion therebetween into opposite armature end positions at the electromagnets in response to electromagnetic fields generated by the electromagnets for moving the cylinder valve into end positions thereof and return springs coupled to the armature and opposing, by a spring force, the displacements of the armature in response to the electromagnetic fields. The current supply to at least one electromagnet is so controlled and the generated electromagnetic field is so directed that in an end position of the cylinder valve the armature is held at the electromagnet against the spring force and out of contact with the pole faces of the electromagnet.

8 Claims, 2 Drawing Sheets

METHOD AND APPARATUS FOR OPERATING A CYLINDER VALVE WITH AN ELECTROMAGNETIC ACTUATOR WITHOUT POLE FACE CONTACTING

CROSS REFERENCE TO RELATED APPLICATION

This application claims the priority of German Application No. 196 51 846.6 filed Dec. 13, 1996, which is incorporated herein by reference.

BACKGROUND OF THE INVENTION

U.S. Pat. No. 4,455,543 describes an electromagnetic actuator for operating a cylinder valve in an internal-combustion engine. The actuator essentially is formed of two spaced electromagnets wherein the pole faces of one electromagnet are oriented towards the pole faces of the other electromagnet. In the space defined between the pole faces of the two electromagnets an armature is disposed which is coupled with the cylinder valve and which, dependent upon the alternating energization of the electromagnets, moves back and forth against the force of resetting springs. In the respective terminal position of the cylinder valve (open or closed position) the armature is in engagement with the pole face of the respective holding magnet and is maintained there as long as the holding electromagnet is in an energized state. In the position of rest the armature is in a mid position between the pole faces of the two electromagnets, determined by the force equilibrium of the two oppositely working resetting springs.

If, during operation, the armature is to be displaced from one of its end positions into the other, the holding electromagnet is de-energized so that the armature, together with the cylinder valve, is moved by the force of the associated return spring in the direction of the mid position (position of rest). Upon subsequent energization of the opposite, capturing electromagnet, the armature will be in the effective range of the magnetic field of the capturing electromagnet and is moved by means of the magnetic force against the force of the other return spring into the other end position. As the armature impacts on the pole face of the capturing electromagnet, noise is generated whose intensity is dependent from the magnitude of the impact velocity. At the same time, risks are high that the armature rebounds which, for example, upon closing the cylinder valve, may lead to a brief reopening of the valve after the latter has already been seated. By a suitable control of the energization of the momentarily capturing electromagnet it is feasible to reduce the impact velocity; yet, the impact velocity has to be at all times sufficiently high to ensure that the armature is securely captured, that is, it securely arrives into engagement with the pole face.

To minimize the unavoidable impact noises, an impact velocity of approximately 0.02 m/s is required for the armature in electromagnetic valve drives of the above-outlined type. Such low impact velocities have to be ensured in all real operating conditions while taking into consideration all related stochastic fluctuations; this, however, requires a substantial circuitry outlay. In vehicle engines irregularities in the road surface or other effects in the terminal approaching phase of the armature are sufficient to cause a sudden drop of the armature in case the magnetic force is oriented precisely in the direction of force requirement which is necessary for such a minimum impact velocity. A residual noise, however, cannot be avoided.

SUMMARY OF THE INVENTION

It is an object of the invention to provide an improved method and apparatus for operating an electromagnetic valve actuator from which the discussed disadvantages are eliminated.

These objects and others to become apparent as the specification progresses, are accomplished by the invention, according to which, briefly stated, the current supply to at least one of the two electromagnets of the electromagnetic valve actuator is so controlled and the generated electromagnetic field is so oriented that in an end position of the cylinder valve the reciprocatable armature which operates the valve is held at the electromagnet against a resetting spring force and out of contact with the pole faces of the electromagnet.

According to the invention as outlined above, the armature does not impact on the pole face but is "softly" caught by an appropriately oriented magnetic field. By a suitable control of the energization of the electromagnet it is feasible to achieve a close-to-zero velocity as the armature reaches its end position. In case such an attempt is unsuccessful, the armature nevertheless may move without impacting the pole face, because the holding force and the positioning of the armature are effected exclusively by the magnetic field and the counterforce of the return spring. By virtue of an appropriate control of the energization (current supply) the magnetic field may have an excessive force which prevents an unintended "drop" of the armature in response to external force effects. Thus, even in case of a "creeping" of the armature into the end position, external impact forces cannot lead to a drop of the armature.

According to an advantageous feature of the invention, the magnetic field provided for a contactless holding of the armature is oriented substantially perpendicularly to the direction of armature motion, relatively to the end position of the armature. This is effected, for example, by providing that the respective electromagnet has two spaced pole faces which are essentially oriented towards one another. Upon release from the holding electromagnet the armature receives sufficient kinetic energy to move beyond the position of equilibrium determined by the resetting springs and it approaches the capturing electromagnet to such an extent that it arrives in the force range of the magnetic field of the capturing electromagnet and is thus continued to be moved in the direction of motion against the force of the effective return spring. As soon as the armature is situated between the two pole faces of the capturing electromagnet, the maximum magnetic force is exerted thereon so that the armature is maintained in the end position determined by those pole faces. The force of the magnetic field has to be designed such that it corresponds to the force of the compressed resetting spring.

According to a further advantageous feature of the method of the invention, upon energization of the electromagnet which holds the armature in a contactless manner, the current is reduced before the armature reaches its end position. In this manner it is possible to reduce the approaching velocity of the armature to avoid "overshooting". The energization may be controlled such that as the armature reaches its end position, the current is again increased to such an extent that the necessary holding force is exerted securely on the armature and thus an undesired armature motion triggered by outer force effects is avoided.

According to a further advantageous feature of the invention, the armature which is held in its end position in a contactless manner by the electromagnet, is additionally exposed to the force of at least one permanent magnet. The permanent magnet force is oriented in the same direction as the electromagnetic field and is of such a magnitude that it affects the armature less than the force of the associated return spring. By providing such a permanent magnetic field, the current required for holding the armature may be advantageously reduced particularly in the open position of the engine valve, because one part of the magnetic force is applied by the permanent magnet. To release the armature, the surplus force of the return spring is sufficient to overcome the force of the permanent magnet field after de-energization of the electromagnet.

DESCRIPTION OF THE PREFERRED EMBODIMENTS

Figure 1:
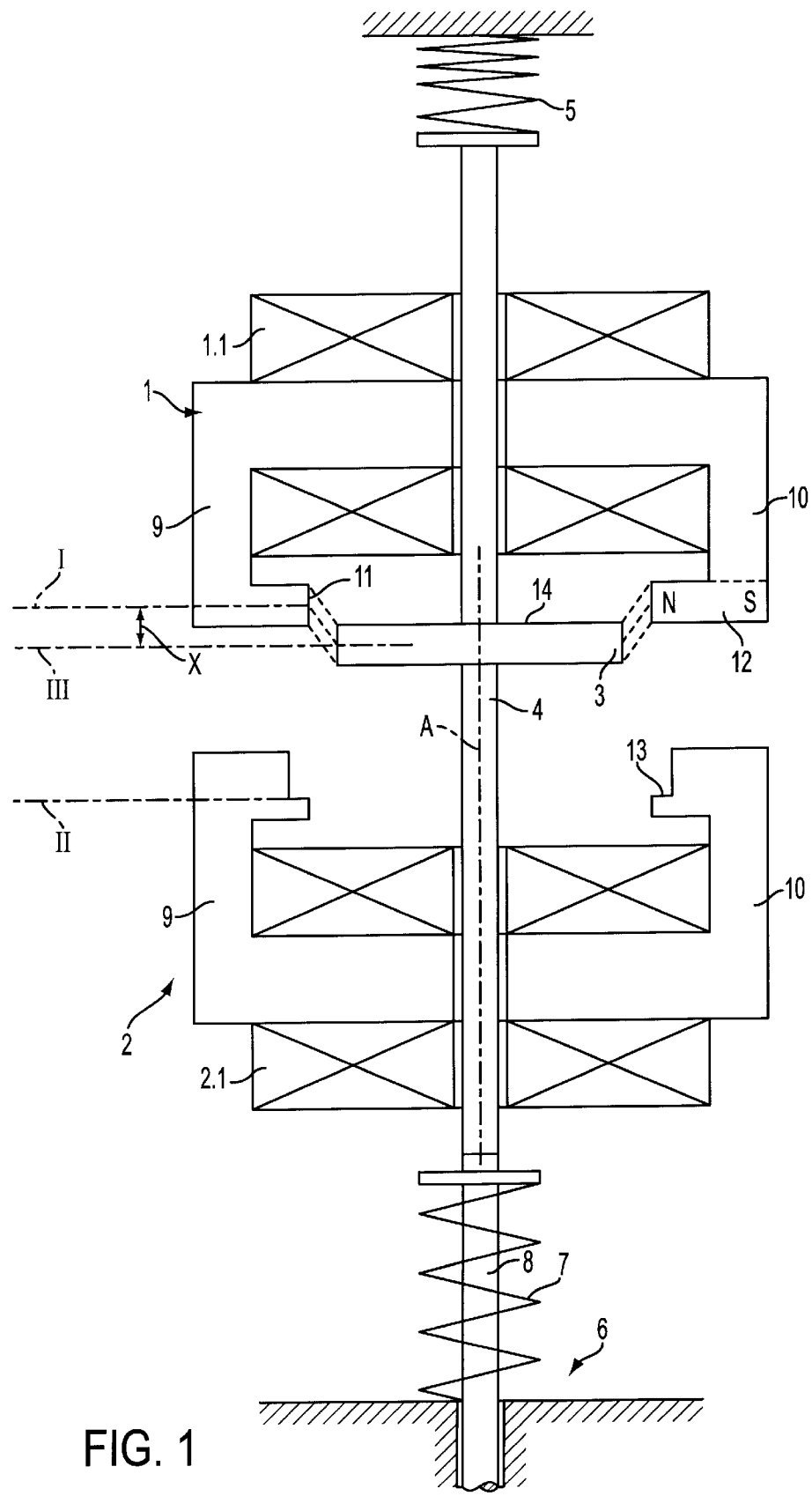
FIG. 1 is a schematic elevational view of a preferred embodiment of an electromagnetic actuator for performing the method according to the invention.

The electromagnetic actuator shown in FIG. 1 in a basic representation is formed essentially of two spaced electromagnets 1 and 2 functioning, respectively, as a closing magnet and an opening magnet. An armature 3 is arranged between the two electromagnets 1 and 2 for reciprocation parallel to the actuator axis A. The armature 3 is connected to a guide rod 4 which is guided in the region of the electromagnets 1 and 2.

A cylinder valve 6 operated by the electromagnetic actuator is maintained in the closed position by a closing spring 7. The cylinder valve 6 has a valve shaft 8 whose upper end is engaged by the bottom end of the guide rod 4. The upper end of the guide rod 4 is supported on a stationary component with the interposition of an opening spring 5. The opening spring 5 and the closing spring 7 affect the armature 3 via the guide rod 4 as resetting springs and exert oppositely oriented forces. When the electromagnets 1 and 2 are in a de-energized state, the armature 3 is maintained by the two resetting springs 5 and 7 in a position of equilibrium between the two electromagnets 1 and 2. By setting the bias of the opening spring 5 with the aid of non-illustrated setting means (such as a setscrew), the distance of the position of equilibrium from the two electromagnets 1 and 2 may be adjusted.

In the illustrated embodiment the solenoid 1.1 of the electromagnet 1 functioning as the closing magnet is energized, as a result of which the cylinder valve 6 is maintained in its closed position against the force of the opening spring 5 by the magnetic field of the electromagnet 1.

The two electromagnets 1 and 2 are substantially of identical construction; they each have two lateral pole shoes 9 and 10 whose pole faces 11 are oriented in a direction perpendicular to the actuator axis A, so that when a magnetic field is generated by the energization of the respective electromagnet, the magnetic field is oriented substantially perpendicularly to the actuator axis A and thus to the direction of motion of the armature 3. The resetting force of the opening spring 5 on the one hand and the force of the magnetic field of the electromagnet 1 on the other hand are so dimensioned that in the shown closed position the armature 3 assumes a position in which it is situated slightly lower than the height level of the two pole faces 11. As shown by the symbolically illustrated field lines, in the illustrated position a magnetic residual force remains which acts in the closing direction; the force equilibrium is, however, so selected that the lower end of the guide rod 4 does not lift off the upper end of the valve shaft 8.

Upon de-energizing the coil 1.1 of the electromagnet 1, the armature 3 moves under the force of the compressed opening spring 5 towards the electromagnet 2. Upon energization of the coil 2.1 of the electromagnet 2, for example, at the moment when the armature traverses the mid position, the armature 3 is exposed to the magnetic field of the electromagnet 2 and is, as a result, pulled into the "valve open" position in between the two pole faces of the electromagnet 2 and is held in that position against the force of the closing spring 7, so that the cylinder valve 6 is maintained in its open position.

For supporting the electromagnetic holding force, a permanent magnet may be arranged at the pole shoe 9 and/or 10 of the electromagnets 1 and/or 2 and co-oriented with the electromagnetic field of the energized electromagnets 1 and 2. FIG. 1 shows one permanent magnet 12 attached to the pole face of the pole shoe 10 of the electromagnet 1 and forming the radially inwardly directed leg thereof. By virtue of the magnetic force of such permanent magnet or magnets, the magnetic field of the electromagnets 1 and/or 2 is reinforced in the holding position, so that a lower current intensity is required for holding the armature 3.

As seen in FIG. 1, the armature 3 may move further beyond its respective end position without impacting the pole face, in case the velocity of the armature is greater than zero when the end position is reached. The flat force pattern achieved by the orientation of the magnetic field in the vicinity of the desired end position permits a soft armature approach which may be controlled by regulating the current of the capturing electromagnet.

In the illustrated embodiment the armature 3 is a circular disk-shaped component and the pole faces 11 are of hollow cylindrical shape. The air gap between the outer periphery of the armature 3 and the pole faces 11 is 0.1 mm at the most. Such a small air gap ensures that the required holding current may be maintained at a practical magnitude. By virtue of the circular design of the armature 3 it is ensured that the torsional armature motions caused by the return springs 5 and 7 have no effect on the operation and free mobility of the armature 3. By arranging a step 13 on the pole faces 11, one part of the magnetic field may be oriented in a direction towards the mid position so that the capturing magnetic force has an earlier effect on the armature 3 as it approaches the capturing electromagnet 2.

The actuator illustrated in FIG. 1 may be modified such that the electromagnet which holds the armature 3 in the closed position has a conventional construction, that is, its pole face is oriented towards the surface 14 of the armature 3 so that—as heretofore—the armature is held in contact with the pole face of the electromagnet. Although noise generation upon impacting of the armature on the pole face will occur, the required holding current, however, may be reduced.

Figure 2:
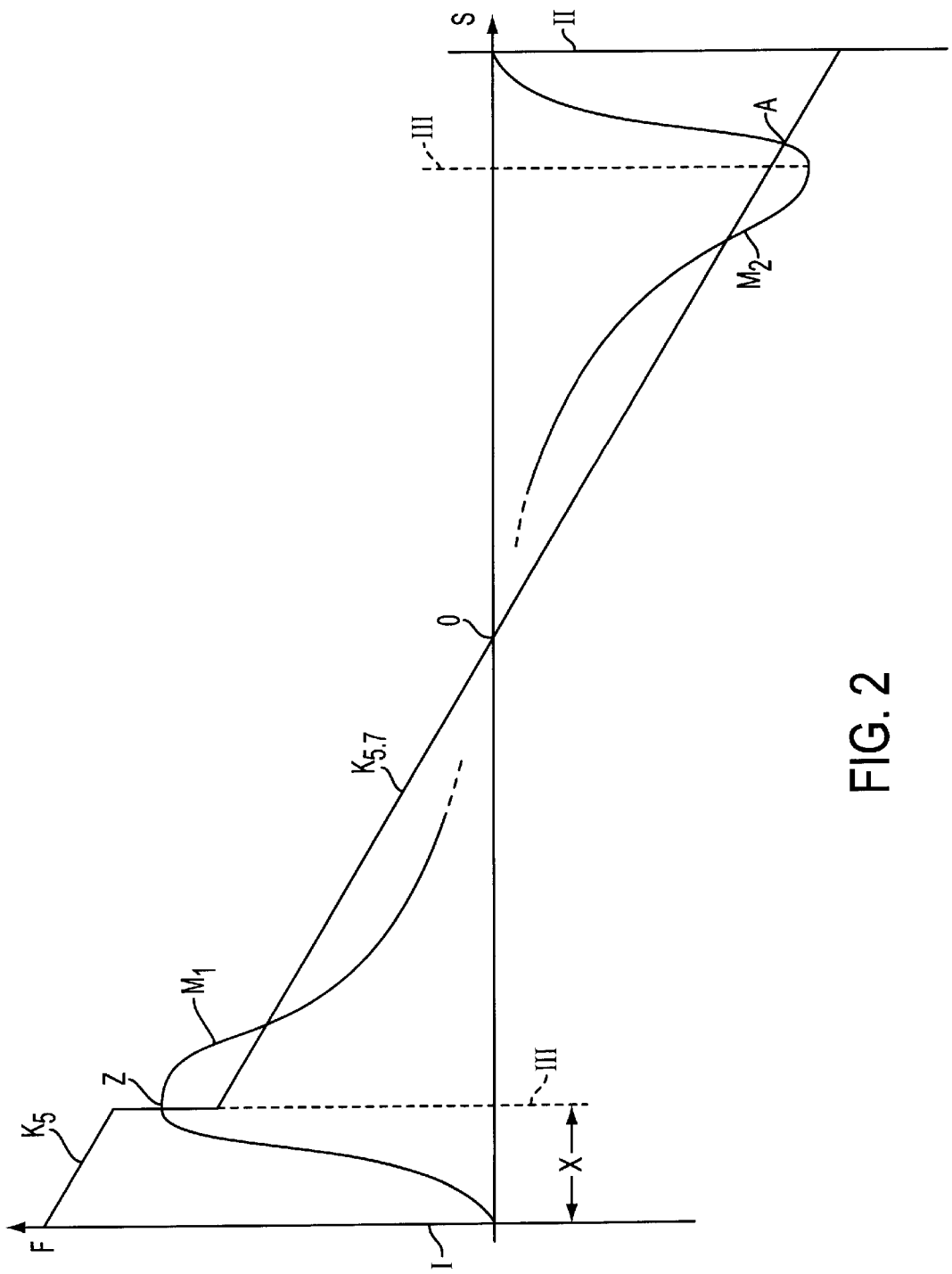
FIG. 2 is a diagram illustrating the magnetic forces and spring forces as a function of armature displacement.

FIG. 2 illustrates the forces F acting on the armature 3 as a function of the armature displacement s. The curve $M_1$ represents the magnetic force of the electromagnet 1 from the effective plane I toward the armature 3, while the curve $M_2$ represents the magnetic force of the electromagnet 2 from the effective plane II, in the opposite direction toward the armature 3. Starting from the position of equilibrium 0 of the forces of the return springs 5 and 7, directed oppositely to one another across the point of equilibrium 0, on opposite sides of the abscissa s a practically linear spring characteristic $K_{5,7}$ is obtained which exerts a force on the armature 3 dependent upon its momentary position from the point of equilibrium 0.

In the "valve closed" position of the closing magnet 1 the characteristic curve for the spring force has a "jump" caused by the fact that after the valve 6 is seated, only the opening spring 5 can act on the armature 3, while the closing spring 7 holds the valve 6 firmly against its seat.

A comparison between the magnet force curves on the one hand and the spring force curves on the other hand show that a position of equilibrium is given for the "valve closed" position at the peak Z of the magnet force curve $M_1$ and for the "valve open" position in the point of intersection A between the spring curve K and the magnet force curve $M_2$. The distance between the two positions of equilibrium equals the valve stroke. The distance x between the central plane III of the armature shown in FIG. 1 and the central plane I of the pole faces of the electromagnet 1 indicates the position of the armature 3 in the position of equilibrium in the "valve closed" position. Likewise, the "valve open" position is determined by the distance of the mid plane III of the armature 3 to the mid plane II of the pole faces of the electromagnet 2.

It is seen from FIG. 2 that in the region of the point Z and the point A the magnet force is greater than the spring force so that a displacement of the armature from either end position under the effect of external impact forces is practically not possible and therefore an unintentional closing or opening of the cylinder valve in response to such external forces is reliably prevented.

By means of a suitable control of the current supply to the electromagnets 1 and 2 the course of the curves $M_1$ and $M_2$ may be altered.

It will be understood that the above description of the present invention is susceptible to various modifications, changes and adaptations, and the same are intended to be comprehended within the meaning and range of equivalents of the appended claims.

What is claimed is:

1. A method of operating a cylinder valve of an internal-combustion engine with an electromagnetic actuator for moving the cylinder valve into opposite open and closed valve end positions; said electromagnetic actuator having two spaced electromagnets provided with pole faces and being energizable with a controllable current flow, an armature operatively connected to the cylinder valve and arranged in a space between the two electromagnets for a reciprocating motion therebetween into opposite armature end positions at the two electromagnets in response to electromagnetic fields alternatingly generated by the two electromagnets for moving the cylinder valve into end positions thereof and return springs coupled to the armature and opposing, by a spring force, the displacements of the armature in response to the electromagnetic fields; the method comprising the steps of directing the electromagnetic field of at least one of the two electromagnets within said space substantially perpendicularly to a direction of said reciprocating motion and controlling the current supply to said one electromagnet to provide an equilibrium between a force of the electromagnetic field of said one electromagnet and an opposing force of one of said return springs in at least one of the cylinder valve end positions for holding the armature in the armature end position at said one electromagnet out of contact with the pole faces of said one electromagnet.

2. The method as defined in claim 1, wherein said step of controlling the current supply comprises the step of reducing the current supplied to said one electromagnet shortly before the armature reaches the armature end position at said one electromagnet.

3. The method as defined in claim 1, further comprising the steps of directing the magnetic force of a permanent magnet to said armature in the armature end position thereof at said one electromagnet codirectionally with the electromagnetic force of said one electromagnet and dimensioning the magnetic force of said permanent magnet such as to be less than the spring force opposing the electromagnetic force applied to said armature in said armature end position.

4. An assembly composed of a cylinder valve of an internal-combustion engine and an electromagnetic actuator operating said cylinder valve to assume open and closed end positions; said electromagnetic actuator comprising (a) an actuator axis;

(b) an armature operatively coupled to said cylinder valve and arranged for reciprocating motion in a direction parallel to said actuator axis for moving said cylinder valve into said open and closed end positions;

(c) return springs disposed on opposite sides of said armature for exerting oppositely oriented spring forces thereon in a direction parallel to said actuator axis; and (d) first and second electromagnets spaced from one another in a direction parallel to said actuator axis and defining a space which said armature traverses during reciprocation; each electromagnet having a solenoid and pole shoes for orienting electromagnetic forces generated by the electromagnets upon passing an energizing current through the solenoids; the pole shoes of at least one of said electromagnet having pole faces situated laterally of said space for preventing collision with said armature; said pole faces being oriented in a direction transverse to said actuator axis for directing the electromagnetic forces of said at least one electromagnet transversely to said direction of said reciprocating motion, whereby the electromagnetic forces of said one electromagnet hold said armature in an armature end position at said one electromagnet against a spring force without said at least armature contacting said pole faces.

5. The assembly as defined in claim 4, wherein said pole faces are directed perpendicularly to said actuator axis.

6. The assembly as defined in claim 4, wherein each said pole shoe has a leg portion oriented towards said actuator axis and a free terminal surface forming said pole face.

7. The assembly as defined in claim 4, further comprising a permanent magnet arranged at one of said pole shoes and having a magnetic field superposed on and at least partially codirectional with the electromagnetic field generated by said one electromagnet.

8. An assembly composed of a cylinder valve of an internal-combustion engine and an electromagnetic actuator operating said cylinder valve for moving the cylinder valve into opposite open and closed valve end positions; said electromagnetic actuator having two spaced electromagnets provided with pole faces and being energizable with a controllable current flow, an armature operatively connected to the cylinder valve and arranged in a space between the two electromagnets for a reciprocating motion therebetween into opposite armature end positions at the electromagnets in response to electromagnetic fields generated by the electromagnets for moving the cylinder valve into end positions thereof and return springs coupled to the armature and opposing, by a spring force, the displacements of the armature in response to the electromagnetic fields; and comprising means for directing the electromagnetic field of at least one of the electromagnets within said space substantially perpendicularly to a direction of said reciprocating motion for holding, in at least one of the end positions of the cylinder valve, the armature in the armature end position at said one electromagnet against the spring force out of contact with the pole faces of said one electromagnet.

* * * * *